Figure 1:
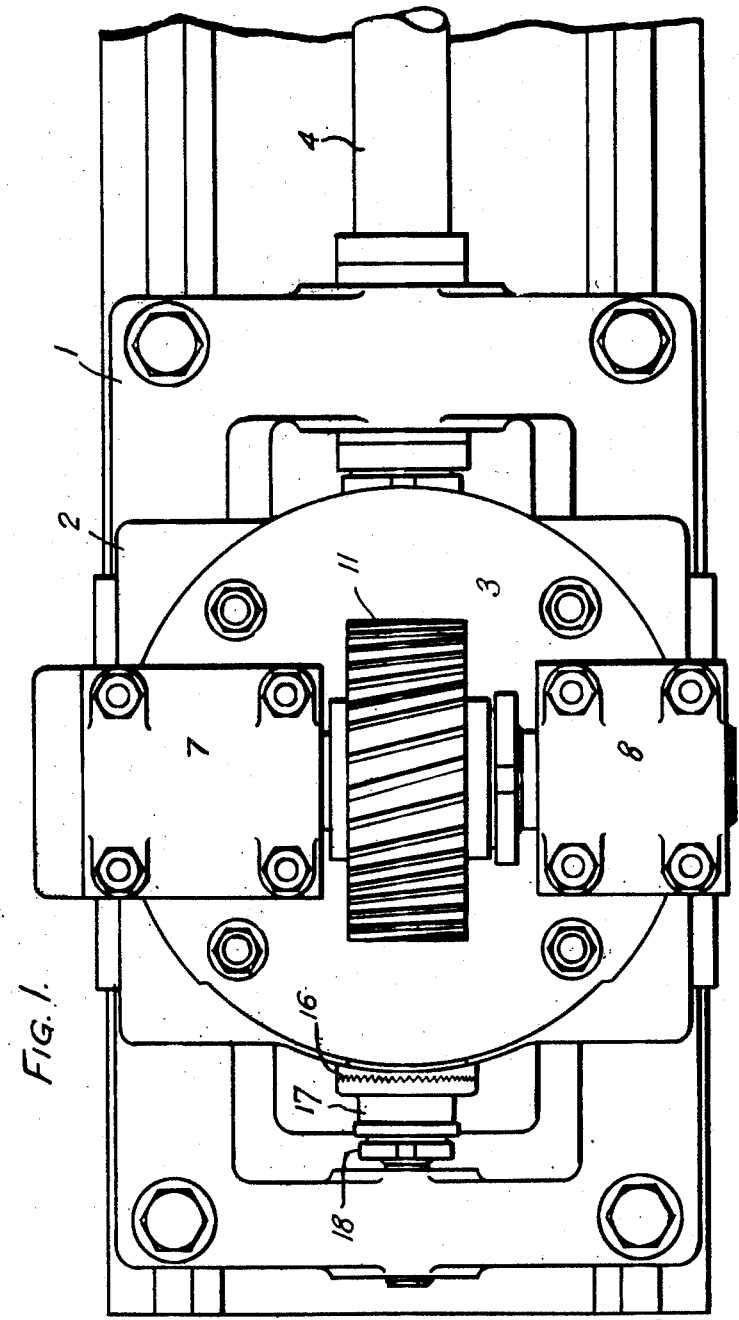

Inventor
Robert J. McLeod
by Wilkinson & Mawhinney
Attorneys

Patented June 5, 1951

2,556,143

UNITED STATES PATENT OFFICE 2,556,143

APPARATUS FOR FINISHING GEAR TEETH BY SHAVING PROCESSES

Robert James McLeod, West Drayton, England; Barclays Bank Limited, London, England, executor of said Robert James McLeod, deceased Application August 6, 1945, Serial No. 609,096
In Great Britain October 17, 1944

3 Claims. (Cl. 90—1.6)

The object of the present invention is to provide an auxiliary machine or attachment, which can be readily fitted to the hob carriage of a gear hobbing machine or to the tool carriage of a gear shaper or planer, and perform the process of gear shaving without the necessity of providing a special and separate machine.

As the process is essentially a finishing one, the gear is first rough cut, and then in place of the hob or cutting tool the auxiliary machine or, as it shall be referred to, the attachment is mounted on the hob or tool carriage and the process of gear shaving begun without removing the gear wheel or the job from the machine.

To enable this to be done readily, the attachment is provided with feet or flanges to suit the particular gear cutting machine, and occupy the space taken up by the gear cutting tool and its spindle.

The attachment is provided with a free running spindle mounted in bearings with provision for taking up any imposed axial thrust in either direction. Upon this spindle is mounted the shaving tool, which is in the form of a pinion having involute teeth of correct pitch, pressure angle and tooth proportions to suit the particular gear wheel or gear pinion it is desired to finish. The teeth are provided with serrations or grooves across from tip to root of the teeth so as to form a number of cutting edges, whilst the helical angle may be identical with the job or may be less.

This process of shaving gears is performed by first meshing the shaving cutter with the teeth of the gear to full depth or thereabouts, and then rotating the gear, thus the gear drives the shaving cutter. At this stage it is usual for the shaving cutter to be fed into depth until a sufficient cutting action is imposed, then axial feed is applied which may vary from 0.0005" to 0.010" per revolution of the gear, and the process continued until the shaving cutter has traversed the whole face width of the gear.

When special gear shaving machines are used a relatively high pitch line velocity of the gear has been found to be advantageous and possible.

Gear cutting machines, however, are not designed for high rotational speeds; therefore, to compensate for this lack of pitch line velocity I introduce an oscillatory motion having an amplitude equal to, or slightly more or less than, the rate of axial feed of the shaving cutter per revolution of the gear.

The direction of these oscillations may be parallel to the teeth or may be offset 15 to 20 degrees so as to induce a cross axis cutting effect. Similarly the free running spindle may be set with its axis at right angles to the direction of the teeth in the gear or may be offset 15 to 20 degrees therefrom. Thus, I may offset the direction of the oscillations or I may offset the shaving cutter and its spindle, either one or the other or both.

Figure 2:
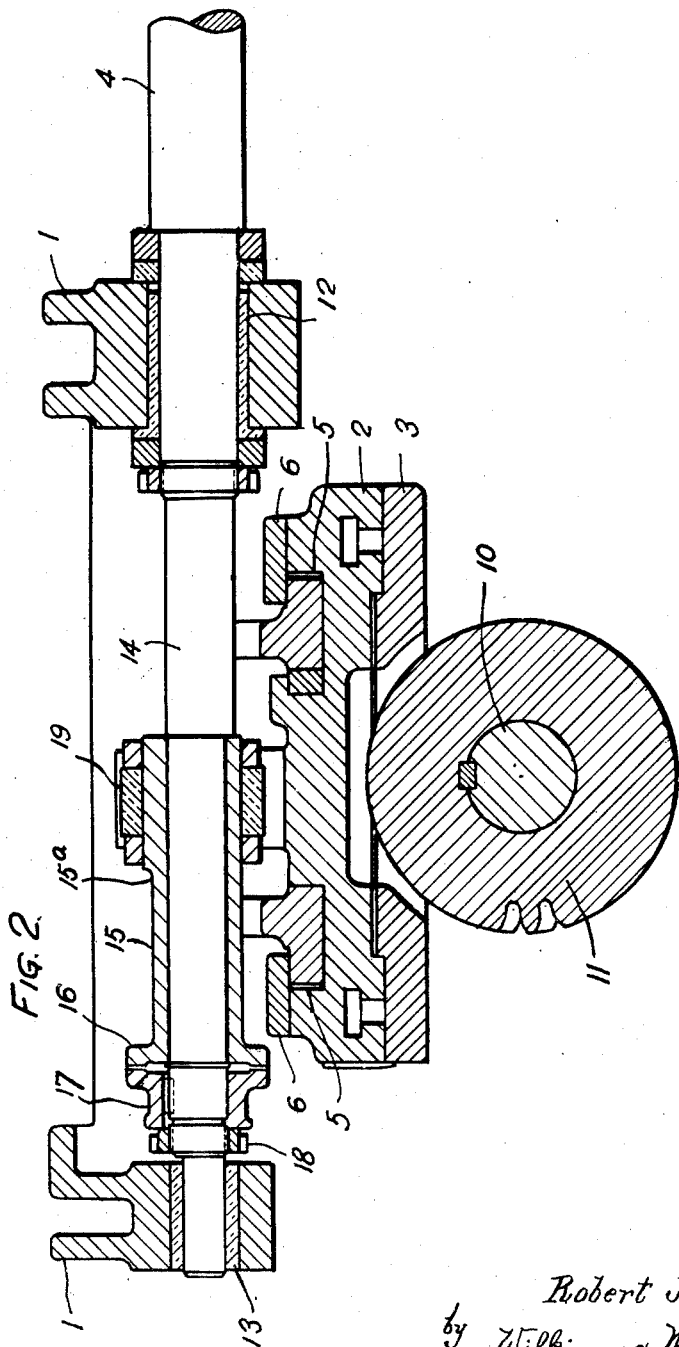
Figure 3:
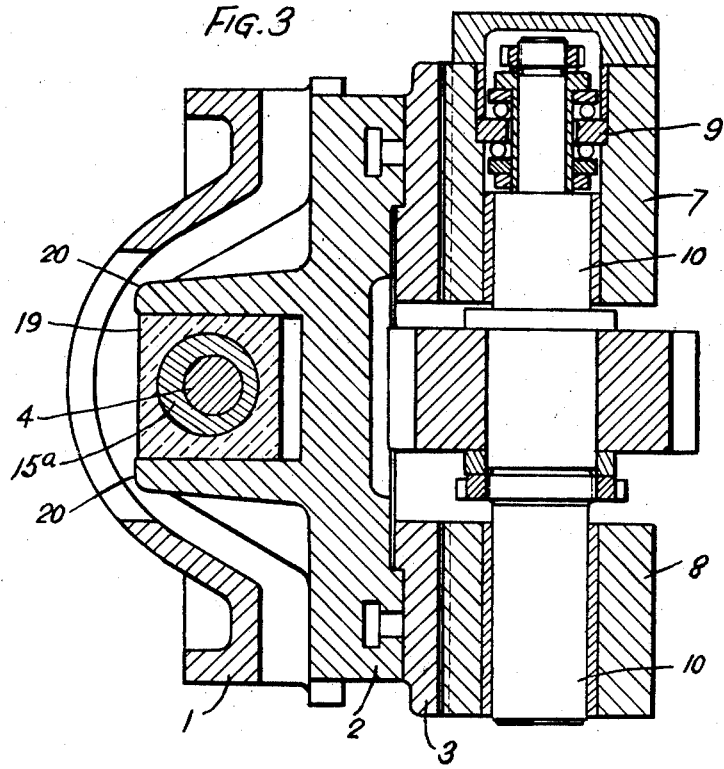
Figure 4:
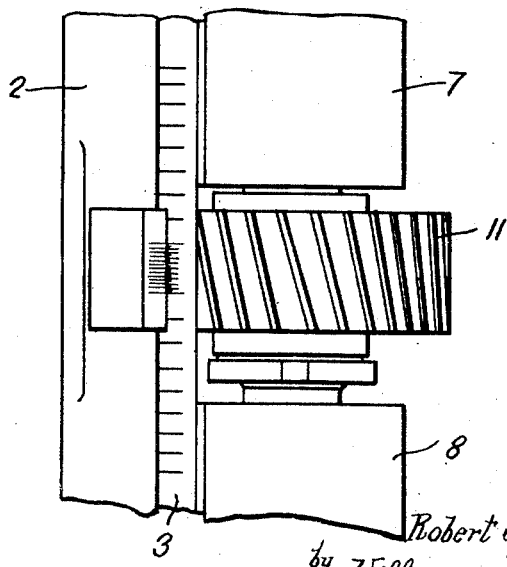

In the accompanying drawings in which like numerals are used to designate like parts throughout, Fig. 1 is a front elevation of the attachment mounted in place of the hob on the hob carriage of a gear cutting machine, Fig. 2 is a sectional elevation through the vertical centre line of Fig. 1, Fig. 3 is a sectional plan through the horizontal centre line, Fig. 4 is a detail view of the cutter and its spindle showing the graduations on the circular swivelling plate which controls the angle of tilt given to the cutter.

Referring to Figs. 1, 2 and 3, 1 is the base of the attachment and must be made to suit the particular gear cutting machine. It is provided with slideways 5, Fig. 2 upon which is slidably mounted a saddle 2 having the usual keep plates 6 and adjusting keys. The front part of saddle 2 is provided with a circular face with T slots, upon which face is mounted a circular plate 3 having a portion of its edge graduated in degrees and parts thereof, Fig. 4. Fitted to this circular plate 3 are two bearings 7 and 8 which carry the free running spindle 10 upon which the gear shaving cutter 11 is mounted. To provide against imposed axial thrust, bearing 7 is fitted with double thrust bearings 9.

The oscillatory motion is obtained from spindle 4 which may be driven by the hob or cutter driving mechanism on the machine or by separate motor. This spindle is suitably supported in bearings 12 and 13 and part is turned "off-centre" as indicated by offset centre line 14, Fig. 2, and thus forms an eccentric. On this spindle is mounted a sleeve 15 having its journal portions 15a offset the same amount as the spindle 4 thus forming another eccentric. On the end of this sleeve 15 nearest the small bearing 13 is provided a serrated surface 16 which engages with a mating serrated clutch surface on half clutch 17, which half clutch is slidably keyed to spindle 4, and controlled by a nut 18 which enables half clutch 17 to be engaged or disengaged with the half clutch 16 on sleeve 15.

As stated above, the throw or offset of the two eccentrics are equal; if the amounts are represented by A and A', then when the eccentrics are set so that A=A', then a double amplitude is obtained; similarly, if they are set so that their offset centres are opposite each other then the amplitude is A−A', or zero, therefore, any amplitude or length of stroke of oscillation can be obtained from double throw to zero to suit the rate of feed of the shaving cutter.

The journal portion of the sleeve 15 runs in a sliding block 19 which block slides between the horns 20 on saddle 2, Fig. 3, thus completing the crank mechanism.

I do not confine myself to the above method of obtaining the oscillations but may use and adjustable throw crank.

I claim:

1. For use with a gear hobbing machine having means for rotatably supporting a blank gear to be cut and shaved and means for rotating the blank gear, an auxiliary attachment comprising a frame having means to removably attach the same to the hobbing machine, a saddle mounted to reciprocate on said frame, a gear shaving cutter freely rotatable on said saddle and adapted when the attachment is mounted to the machine to mesh with the teeth of the blank gear whereby the shaving cutter is rotated by the blank gear, and means for imparting to the saddle and shaving cutter a reciprocating motion, comprising a rotatable spindle having an offset crank portion, a sleeve having an eccentric portion rotatably adjustable about the offset crank portion of said spindle, a crosshead block received over the eccentric portion of the sleeve, and a guideway on the attachment frame for slidably receiving said crosshead block.

2. An auxiliary attachment as claimed in claim 1 characterized by the fact that the sleeve has a clutch element adjustably rotatable with the sleeve around the offset crank portion of the spindle, a complemental clutch member rotatable with said spindle and slidable thereon into and out of engagement with the sleeve clutch member, and means for maintaining the two clutch members in the engaged position.

3. For use with a gear hobbing machine having means to rotatably support a blank gear, driving means for rotating the blank gear, and a removable roughing cutter for initially cutting the teeth in the blank gear, an auxiliary attachment to replace the roughing cutter comprising a frame having means to mount the attachment on the hobbing machine after the roughing cutter has been removed, a saddle mounted to reciprocate on said attachment frame, a gear shaving cutter mounted for free rotation on said saddle in position when the attachment frame is on the machine to mesh with the teeth of the rough cut blank gear, and means to impart a reciprocating motion to said saddle and gear shaving cutter, comprising a rotatable spindle mounted in said attachment frame and having an offset crank portion, a sleeve rotatably adjustable about the offset crank portion of said spindle and having an eccentric portion, means for securing said sleeve in angularly adjusted position on said spindle, a sliding crosshead block fitted about the eccentric portion of said sleeve and guides on said attachment frame for slidably receiving said crosshead block.

ROBERT JAMES McLEOD.

REFERENCES CITED

The following references are of record in the file of this patent:

UNITED STATES PATENTS

| Number | Name | Date |
|---|---|---|
| 88,733 | Perkins | Apr. 6, 1869 |
| 1,175,066 | Lees | Mar. 14, 1916 |
| 1,948,071 | Hofmann et al. | Feb. 20, 1934 |
| 2,082,516 | Rupple | June 1, 1937 |
| 2,118,453 | Miller | May 24, 1938 |
| 2,184,232 | Christman | Dec. 19, 1939 |
| 2,338,528 | Miller | Jan. 4, 1944 |
| 2,350,882 | Drummond | June 6, 1944 |